United States Patent [19]

Goto et al.

[11] Patent Number: 4,547,223

[45] Date of Patent: Oct. 15, 1985

[54] CEMENT-SHRINKAGE-REDUCING AGENT AND CEMENT COMPOSITION

[75] Inventors: Takaharu Goto, Ichikawa; Takeshi Sato, Narashino; Kouzou Sakai, Kyoto; Motohiko Ii, Uji, all of Japan

[73] Assignee: Nihon Cement Co., Ltd., Kyoto, Japan

[21] Appl. No.: 377,200

[22] PCT Filed: Mar. 2, 1981

[86] PCT No.: PCT/JP81/00042

§ 371 Date: May 4, 1982

§ 102(e) Date: May 4, 1982

[87] PCT Pub. No.: WO82/03071

PCT Pub. Date: Sep. 16, 1982

[51] Int. Cl.$^4$ ................................................. C04B 7/35
[52] U.S. Cl. ...................................... 106/90; 106/104; 106/314

[58] Field of Search ........................... 106/90, 314, 104

[56] References Cited

U.S. PATENT DOCUMENTS

| | | | |
|---|---|---|---|
| 1,633,927 | 6/1927 | Davidson | 568/622 |
| 3,498,921 | 3/1970 | Edwards et al. | 568/625 |
| 3,528,920 | 9/1970 | Niizeki et al. | 568/625 |
| 3,991,122 | 11/1976 | Gritti | 568/625 |

*Primary Examiner*—M. L. Bell
*Attorney, Agent, or Firm*—Wyatt, Gerber Shoup, Scobey and Badie

[57] ABSTRACT

This invention relates to a cement-shrinkage-reducing agent and a cement composition comprising a compound of the general formula RO(AO)$_n$H (in which R represents a C$_{1-7}$ alkyl or C$_{5-6}$ cycloalkyl radical, A represents one or more C$_{2-3}$ alkylene radicals, and n has a value of 1–10) for use in making cement mortar and concrete.

6 Claims, No Drawings

CEMENT-SHRINKAGE-REDUCING AGENT AND CEMENT COMPOSITION

DESCRIPTION

1. Technical Field

This invention relates to a shrinkage-reducing agent for cements and to a cement composition.

2. Background Art

A major disadvantage inevitable to cement mortar and concrete (hereinafter referred to as "concrete and the like" has been that they tend to crack on drying due to their considerable drying shrinkage. For this reason appearance of concrete and the like which will dry with a minimum of contraction has been desired.

With cements, alkylene oxide adducts have hitherto been employed as admixtures to serve varied purposes. For example, polyoxyethylene alkylaryl ethers (in which the alkyl radical usually has from 8 to 10 carbon atoms and the number of moles of the ethylene oxide added usually ranges from 2 to 30 per mole of alkylphenol) are in use as air-entraining agents for cements, admixtures for backing mortar, emulsion stabilizers for cement-containing latexes, etc. Polyoxyethylene-oxypropylene block copolymers (with the total number of moles of the alkylene oxide usually in the range of 30–250) function as cement dispersants, water-content-reducing agents, etc. Higher-alcohol alkylene oxide adducts (with usually 5–30 moles of the alkylene oxide added to each mole of the higher alcohol containing 8 or more carbon atoms) have applications such as air-entraining agents for cements or emulsion stabilizers for cement-containing latexes. Further, polyoxyalkylene glycols (polymers with usually about 15–30 mole alkylene oxide) are in use as dispersants for cement-containing fibers of asbestos, glass wool, etc., or together with ligninsulfonic acid or other cement dispersants to attain greater dispersion.

The alkylene oxide adducts in common use as the cement admixtures are either those with a large number of added moles of the alkylene oxides or those having higher alkyl radicals, and they have functions generally known as surfactants, including dispersing, foaming, and wetting actions. In fact, they are being employed to perform those functions. Nevertheless, those alkylene oxide adducts have no or inadequate, if any, effect as shrinkage-reducing agents for cements.

DISCLOSURE OF THE INVENTION

After our intensive investigations in search of a cement-shrinkage-reducing agent and a cement composition which could yield concrete and the like which will undergo no drying shrinkage in the course of setting and will maintain strength as desired without sacrificing the noncombustibility of the cement itself, the present invention has now been perfected. Briefly, the invention resides in:

A shrinkage-reducing agent for cements comprising a compound of the general formula $$RO(AO)_nH \quad (1)$$

in which R represents a $C_{1-7}$ alkyl or $C_{5-6}$ cycloalkyl radical, A represents one or more $C_{2-3}$ alkylene radicals, and n has a value of 1–10; and A cement composition comprising a cement and, as a cement-shrinkage-reducing agent, a compound of the general formula $$RO(AO)_nH \quad (1)$$

in which R represents a $C_{1-7}$ alkyl or $C_{5-6}$ cycloalkyl radical, A represents one or more $C_{2-3}$ alkylene radicals, and n has a value of 1–10.

A compound represented by the general formula (1) is easily obtained by adding an alkylene oxide, such as ethylene oxide and/or propylene oxide, to an alcohol having not more than 7 carbon atoms in the molecule.

In the general formula (1), R denotes a $C_{1-7}$ alkyl or $C_{5-6}$ cycloalkyl radical. Such radicals include, for example, methyl, ethyl, n-propyl, isopropyl, n-butyl, isobutyl, n-pentyl, isopentyl, cyclopentyl, cyclohexyl, n-hexyl, isohexyl, n-heptyl, and isoheptyl-radicals. Of these radicals, $C_{1-5}$ alkyl or cyclohexyl radicals, particularly butyl radicals, are desirable for their cement-shrinkage-reducing effects. Alkyl radicals with 8 or more carbon atoms are undesirable because they reduce the cement solubility in water, give less shrinkage-controlling effects, and/or, where more alkylene oxide is added to make the compound fully water-soluble, they may function as surfactants, imparting excessive foamability to the concrete. (Admixture of cement with a foamable compound will seriously decrease the strength of the resulting concrete and the like due to excessive air entrainment.)

In the formula given above, A signifies a $C_{2-3}$ alkylene radical, e.g., ethylene and/or propylene radical. Also, n (the number of moles of the alkylene oxide added) ranges from 1 to 10. If n is less than 1, the compound is of no use since, when admixed with a cement, it would impart an inadequate anti-shrinkage effect, cause too much alcohol evaporation, or invite some other trouble. If the value is greater than 10, the result will again be a low shrinkage-reducing effect and, in addition, improper air entrainment in the concrete and the like.

The desirable range of n depends on the kind of the alkylene oxide to be added. For example, where the alkylene oxide is ethylene oxide, the proportion is desirably in the range of 1 to 5 moles per mole of the alcohol in view of the shrinkage-reducing effect, odor, volume of air to be entrained, and other considerations. Where propylene oxide is chosen instead, one mole to each mole of the alcohol is desirable by reason of the shrinkage-reducing effect as well as of economy. Ethylene oxide and propylene oxide may be used in combination, in which case the number of moles to be added is usually between 2 and 10 per mole of the alcohol. When the two oxides are to be employed, the molar ratio of $C_2H_4O$ to $C_3H_6O$ is desired to be in the range of 0.2–5.0 since it imparts low foamability and reduction of shrinkage. Addition of two such alkylene oxides may be by either the random or block method for the sake of the shrinkage-reducing effect. For low foamability, however, the random addition is preferred.

As stated above, the compound represented by the general formula (1) is one obtained by addition of ethylene oxide and/or propylene oxide to an alcohol. Alternatively, the compound may be prepared by adding, in addition to such a $C_{2-3}$ oxide, another alkylene oxide, such as butylene or styrene oxide, in a quantity not large enough to impair the desired properties of the compound (i.e., usually not more than 50% of the total weight of oxyalkylene radicals).

Examples of the compounds that may be represented by the formula (1) are

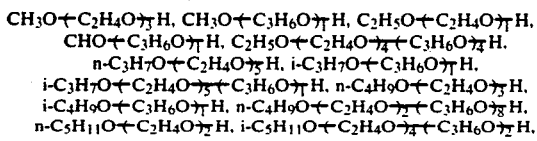

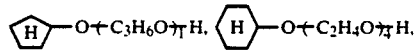

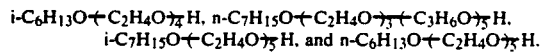

Needless to say, useful compounds are not limited to the abovementioned, but all compounds that fall under the general formula (1) may be employed as well.

While the cement-shrinkage-reducing agent according to this invention is a compound or a mixture of two or more compounds of the general formula (1), it may be admixed with cement in an alternate form of a compsotion of such a compound or compounds together with a diluent (e.g., water).

The cements with which the shrinkage-reducing agent of the invention may be used include ordinary, quick-hardening, and moderate-heat portland cements, alumina cement, blast-furnace slag cement, and flyash cement. Of these ordinary portland cements of ordinary and quick-hardening types are particularly desirable.

It may vary with factors such as the carbon number of the alkyl radical and the number of moles of the alkylene oxide added to the compound of the general formula (1). But the quantity of the shrinkage-reducing agent to be used in accordance with the invention is usually in the range of 0.5-10%, preferably 1.5-5%, based on the weight of cement. If the quantity is less than 0.5% by weight, the compound will give only a little shrinkage-reducing effect. If the quantity exceeds 10 wt%, it will not produce a satisfactory concrete for practical purposes, with the strength less than about two-thirds those of similar concrete and the like without the admixture. The quantity of water to be used for setting the cement is not critical and has only to be sufficient to attain the end, usually 29-90%, preferably 30-70%, based on the weight of cement. Where necessary in hardening the cement, an aggregate such as pebbles, gravels, sand, pumice, or fired pearlite may be employed. The aggregate is usually used in an amount such that the cement/aggregate percentage is 10-200%, preferably 15-100% by weight. The quantity of the shrinkage-reducing agent is usually 0.5-10%, based on the weight of the cement, or usually 0.1-5% on the basis of the total weight of the cement, shrinkage-reducing agent, water, and aggregate combined.

Any other (optional) ingredient or ingredients may also be used. Among the optionally employable admixtures are: conventional hardening accelerators, e.g., metal chlorides, such as calcium chloride and sodium chloride, metal sulfates, such as sodium sulfate, and organic amines such as triethanol-amine; ordinary hardening retarders, e.g., alcohols, sugarts, starch, cellulose, and glycerin; reinforcing-steel corrosion inhibitors, such as sodium nitrate and calcium nitrite; and cement dispersants, such as ligninsulfonic acid, oxycarboxylic acid, and formalin condensate of naphthalenesulfonic acid. The quantity of such an optional ingredient or ingredients is usually 0.1-5% by weight of the cement.

The manner of adding the shrinkage-reducing agent of the invention to the cement may be the same as with ordinary cement admixtures. For example, the shrinkage-reducing agent is admixed with a suitable proportion of water and then this composition is mixed with cement and aggregate. As an alternative, a suitable amount of the shrinkage-reducing agent may be added when cement, aggregate, and water are mixed.

The concrete and the like incorporating the shrinkage-reducing agent according to the invention may be applied in conventional ways. For example, it may be trowelled, filled in forms, applied by spraying, or injected by means of a caulking gun. Hardening or curing of the concrete and the like may be by any of the air drying, wet air, water, and heat-assisted (steam, autoclave, etc.) curing techniques. If desired, two or more such techniques may be combined. The respective curing conditions may be the same as in the past.

The addition of the shrinkage-reducing agent of the invention to the cement will markedly reduce the drying shrinkage of the resulting concrete as compared with that of the plain concrete. The admixture according to the invention will scarcely decrease the noncombustibility of the concrete and the like and, even when added in a large proportion (e.g., several percent), it will not materially reduce the strength of the product.

The shrinkage-reducing agent of the invention, which is prepared by adding a small amount of an alkylene oxide to an alcohol, has no function of a surfactant, such as dispersibility or foamability. Rather, it functions similarly to a water-soluble organic solvent. In this sense it utterly differs in properties from the common alkylene oxide adducts as ordinary cement admixtures.

BEST FORMS OF EMBODYING THE INVENTION

The present invention is illustrated by the following examples, which are not limitative.

EXAMPLE 1

Varied shrinkage-reducing agents prepared in accordance with the invention and alkylene oxide adducts other than those used for the agents according to the invention were added, in amounts of 4% each by weight of cement, to equal cement portions. No such additive was used on one cement portion. The resulting concrete specimens were tested for shrinkage by the dial gauge method in conformity with the procedure of Japanese Industrial Standards A-1129, for the amount of air in conformity with JIS A-1116, and for the strength in conformity with JIS R-5201. The results are summarized in Table 1.

The water/cement ratio was 40%, and the send/cement ratio was 200%. The test concretes were cured by one week of water curing followed by standing in an atmosphere at 20° C. and a relative humidity of 50% for a given period of time.

The shrinkage-reducing agent No. 5 in Table 1 was prepared by the random addition of 4 moles each of ethylene oxide and propylene oxide to 1 mole of ethanol.

TABLE 1

| No. | Shrinkage-reducing agent | Shrinkage rate ($10^{-4}$) 28-d. | Shrinkage rate ($10^{-4}$) 91-d | Qty. of air (%) | 28-day str. (MPa) Bend. str. | 28-day str. (MPa) Comp. str. |
|---|---|---|---|---|---|---|
| | This invention: | | | | | |
| 1 | $CH_3O(C_2H_4O)_3H$ | 5.2 | 6.3 | 1.7 | 7.31 | 40.1 |
| 2 | $CH_3O(C_3H_6O)_1H$ | 5.1 | 6.3 | 1.7 | 7.23 | 40.4 |
| 3 | $n\text{-}C_4H_9O(C_2H_4O)_3H$ | 5.9 | 6.6 | 1.9 | 6.91 | 39.3 |
| 4 | $1\text{-}C_3H_7O(C_2H_4O)_4H$ | 5.6 | 6.5 | 1.8 | 6.99 | 39.8 |
| 5 | $C_2H_5(C_2H_4O)_2(C_3H_6O)_4H$ | 5.4 | 6.4 | 1.8 | 7.11 | 40.4 |
| 6 |  | 5.9 | 7.1 | 2.0 | 7.18 | 41.4 |
| 7 | $n\text{-}C_5H_{11}O(C_2H_4O)_4H$ | 6.2 | 7.0 | 1.9 | 7.11 | 40.1 |
| 8 | $i\text{-}C_7H_{15}O(C_2H_4O)_5H$ | 6.5 | 7.9 | 2.0 | 6.86 | 38.5 |
| | For comparison: | | | | | |
| 9 | None | 11.1 | 13.1 | 1.7 | 7.15 | 40.7 |
| 10 | $CH_3O(C_2H_4O)_{13}H$ | 8.3 | 9.5 | 4.8 | 4.96 | 32.9 |
| 11 | $n\text{-}C_4H_9O(CHO)_{13}H$ | 9.2 | 9.9 | 4.9 | 5.00 | 32.5 |
| 12 | $n\text{-}C_{12}H_{25}O(C_2H_4O)_{13}H$ | 9.4 | 10.4 | 8.6 | 5.70 | 29.7 |
| 13 | $HO(C_2H_4O)_{15}H$ | 8.3 | 9.1 | 3.4 | 5.90 | 35.8 |

EXAMPLE 2

The shrinkage-reducing agent No. 1 used in Example 1 was added in varied amounts, from 0.1 to 20% by weight, to the cement, and the concrete specimens so obtained were tested in the same way as described in Example 1. The results are given in Table 2.

TABLE 2

| Quantity added (% by weight of cement) | Shrinkage rate ($10^{-4}$) 28-day | Shrinkage rate ($10^{-4}$) 91-day | 28-day strength (MPa) Bend. str. | 28-day strength (MPa) Comp. str. |
|---|---|---|---|---|
| 0 | 11.1 | 13.1 | 7.15 | 40.7 |
| 0.1 | 10.4 | 12.5 | 7.14 | 41.0 |
| 0.5 | 8.1 | 9.4 | 7.21 | 40.9 |
| 1.0 | 6.6 | 7.9 | 7.28 | 40.6 |
| 4.0 | 5.2 | 6.3 | 7.36 | 40.1 |
| 10.0 | 3.1 | 3.8 | 6.91 | 37.5 |
| 20.0 | 3.9 | 4.4 | 3.74 | 19.1 |

INDUSTRIAL APPLICABILITY

With the afore-described advantageous effects, the cement-shrinkage-reducing agent and the cement composition according to the invention will give cured products in the form of concretes useful as civil construction and building materials for foundations, walls, roads, bridges, dams, break-waters, drain pipes, and other structures, and also in the form of cement mortars for coating, brick laying, stone masonry, roofing, tiling, etc.

We claim:

1. A cement composition containing cement and at least one compound selected from the group of compounds of the formulas $$RO(C_2H_4O)_{1\text{-}5}H \quad (2)$$

$$RO(C_3H_6O)_1H \quad (3)$$

$$RO(A_1O)_{2\text{-}10}H \quad (4)$$

in which R represents a $C_{1\text{-}5}$ alkyl or $C_{5\text{-}6}$ cycloalkyl radical, and $(A_1O)_{2\text{-}10}$ is a polyoxyalkylene radical of 2–10 moles consisting of $C_2H_4O$ and $C_3H_6O$.

2. A cement composition according to claim 1, wherein the $C_2H_4O/C_3H_6O$ (molar ratio) in said $(A_1O)_{2\text{-}10}$ is between 0.2 and 5.0.

3. A cement composition according to claim 1, wherein said R is a cyclohexyl radical.

4. A cement composition according to claim 1, containing water as a hardening agent.

5. A cement composition according to claim 1, containing water as a hardening agent, and aggregate.

6. A cement composition according to claim 4 or 5, wherein the amount of water is 25–90% by weight of the cement.

* * * * *

UNITED STATES PATENT AND TRADEMARK OFFICE
CERTIFICATE OF CORRECTION

PATENT NO. : 4,547,223
DATED : October 15, 1985
INVENTOR(S) : Takaharu GOTO, Takeshi SATO, Kouzou SAKI Motohiko II It is certified that error appears in the above—identified patent and that said Letters Patent is hereby corrected as shown below:

On the title page:

Add at line 73 "and Sanyo Chemical Industries, Ltd., Kyoto, Japan"

Signed and Sealed this

Twenty-fifth Day of February 1986

[SEAL]

Attest:

DONALD J. QUIGG

Attesting Officer

Commissioner of Patents and Trademarks